United States Patent Office.

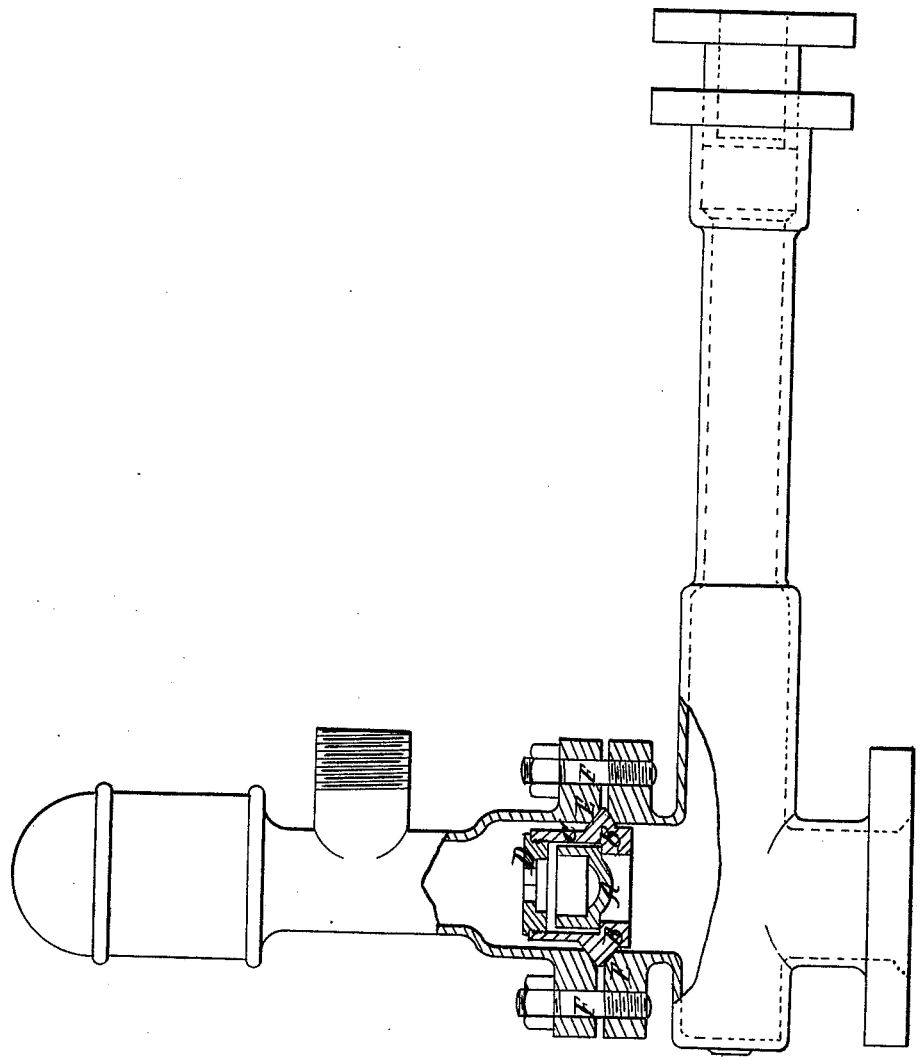

PLUMER CHESWELL, OF MANCHESTER, NEW HAMPSHIRE.

Letters Patent No. 91,211, dated June 15, 1869.

IMPROVEMENT IN FEED-PUMPS FOR LOCOMOTIVE-ENGINES.

The Schedule referred to in these Letters Patent and making part of the same.

*To all whom it may concern:*

Be it known that I, PLUMER CHESWELL, of Manchester, in the county of Hillsborough, and State of New Hampshire, have invented an Improvement in Feed-Pumps; and I do hereby declare that the following is a full, clear, and exact description thereof, which will enable others skilled in the art to make and use the same, reference being had to the accompanying drawings, forming a part of this specification, in which—

Figure 1 represents a partial view, in outline, of a locomotive feed-pump, with a sectional view of one of its valves in position, showing its relation to adjacent parts.

A represents the valve.

B is the valve-seat, having, at its bottom part, a hemispherical flange, extending around the same, and fitting the concave surface of the pump-flange E E.

C is the prolongation upward of the valve-seat B, forming the cage confining the valve A.

D is the cap of the cage C, screwed on, to secure the valve within the cage C.

E E represent the inner circumference of the pump-flanges, made concave, to correspond with the convex surface of the flange of the valve-seat B.

F F are four or more screw-bolts, passing through the pump-flanges, to secure tightly in position the valve-seat B.

Similar letters of reference indicate like parts.

The prime object of this invention is to furnish locomotive-builders with a pump whose valves shall constantly be efficient in use, free from leakage, and cheap in their cost of construction. These points I claim to have gained in my present within-described invention. Twenty years' practical experience in the construction of locomotives convinces me of the inefficiency of the feed-pump valves now in common use, and several months' past trial of valves constructed by the within-described method demonstrates their great superiority over all others heretofore in common use.

The old style of locomotive feed-pump valves are confined within a cage, flanged at the bottom, to correspond with the flange of the valve-seat. These flanges were ground together, and fitted to recesses within the flanges of the pump. These, in turn, were held securely in position by bolts passing through the flanges of the pump, and screwed together as tightly as possible. As all of the bolts could not be tightened at one and the same time, it is reasonable to infer that the pressure together of the flanges of the valve-cage and valve-seat would be liable to be unequal on all sides. Therefore, becoming strained, as they do, it throws them out of line, more or less, to each other, and, as a consequence, leakage results, by the passage out of water between the flanges of the valve-cage and those of the valve-seat, necessitating their frequent removal for repairs. Many attempts have heretofore been made to overcome this evil, but none, to my knowledge, have succeeded as practical experience is now teaching others and myself that my invention does.

My valves are now being used at the Manchester Locomotive-Works exclusively, where my position as foreman gives me ample opportunity for investigation and experiment in this line.

I have thus endeavored to point out the defects in the old method of construction of valves, and now proceed to show the points of difference and superiority of mine:

First, it will be seen, on reference to the drawings, that my valve-seat and cage consist of one piece of metal, having its surface of contact with the flanges of the pump of a hemispherical shape, forming a ball-joint, in combination with the concave surfaces of the pump-flanges. It will thus be seen, that when the bolts of the pump-flanges are tightened on each side, although it may be unequally, it does not throw out of line the valve-seat, but the hemispherical flange of the valve-seat acts like a wedge, and serves to clamp the several parts more tightly together.

The inner edge of the pump-flanges is made concave, as seen in the drawing, to correspond to the convex surface of the valve-seat flange.

The cover of the valve-cage is screwed on, thus securely confining the valve within.

The advantages of this method of construction are, its simplicity, requiring no rubber or other packing between the flanges, less grinding of joints, less skill in making and keeping in repair.

Every locomotive feed-pump, as is well known, requires three sets of valves, and practical experience demonstrates that the weight of metal used in the construction of these pumps can be reduced ten per cent., and the labor of fitting up twenty-five per cent., by the use of this improved valve.

These are important considerations, as these pumps are constructed of brass or composition-metal, costing from thirty-five to forty cents per pound.

Claim.

Having thus described my invention,

I claim as new, and desire to secure by Letters Patent—

The construction and arrangement of the valve-seat B, substantially as described, and for the purpose set forth.

The above specification of my invention, signed by me, this 22d day of December, A. D. 1868.

PLUMER CHESWELL.

Witnesses:
ISAAC W. SMITH,
DAVID CROSS.